UNITED STATES PATENT OFFICE.

CARLETON ELLIS, OF LARCHMONT, NEW YORK, ASSIGNOR TO CHADELOID CHEMICAL COMPANY, OF NEW YORK, N. Y., A CORPORATION OF WEST VIRGINIA.

PAINT OR VARNISH REMOVER.

1,147,848. Specification of Letters Patent. Patented July 27, 1915.

No Drawing. Application filed February 21, 1907. Serial No. 358,578.

*To all whom it may concern:*

Be it known that I, CARLETON ELLIS, a citizen of the United States, and now a resident of Larchmont, in the county of Westchester and State of New York, have made certain new and useful Inventions Relating to Paint or Varnish Removers, of which the following is a specification.

This invention relates to paint or varnish removers and relates especially to removers comprising deodorized light oil of hard wood tar and other solvents.

In the destructive distillation of wood for the production of wood alcohol considerable oil of tar is developed as a by-product. This material has been practically useless for commercial purposes because of its extremely offensive odor which alone is sufficient to prevent its utilization as a general solvent in most cases. This oil of tar, especially that derived from destructive distillation of hard wood and condensing between the temperatures of 75° to 175° C. approximately may be utilized as follows. The crude oil may be conveniently distilled in an ordinary distilling apparatus and the distillates collected up to about 180° C., that is, until the distillate has about the specific gravity of water. This distillate is then preferably redistilled in a column still provided with an efficient dephlegmator and the distillates between about 100° and 165° C. are collected, thus excluding many of the higher boiling point ingredients of the original material, thus securing a light oil of hard wood tar which is more desirable because free from many of the undesirable ingredients of the original crude material. This oil is then preferably deodorized, that is, deprived of its disagreeable odor to a considerable extent by treatment with metallic sodium or similar material which seems to combine with organic substances of this character to form polymeric bodies of higher boiling point so as to be more readily separable from the other components. Metallic sodium also seems to reduce certain unsaturated organic compounds of this character by the action of the nascent hydrogen liberated, the resulting saturated bodies having very much less odor. This deodorizing process may be conveniently carried out in any suitable container, such as a steam jacketed tank provided with suitable agitating means into which the oil of tar and the desired small proportion of sodium or similar material, preferably in granular form, is placed and preferably agitated for several hours at a temperature of 40° to 50° C. Subsequently the material may be redistilled or in some cases may be washed several times by running water slightly acidulated with acetic or other acid into the container and agitating the same so as to neutralize and remove any remaining sodium or other material.

The resulting deodorized light oil of hard wood tar has a specific gravity from about .885 to .905 and is an energetic solvent for ordinary paints and varnishes. It also dissolves paraffin wax quite readily. This material may be used in paint or varnish removers in connection with suitable thinning solvent agents, such as loosening finish solvent material, that is, finish solvents of a generally alcoholic character or action in removers, such as grain or wood alcohol or bodies of a ketone character, such as acetone, methyl ethyl ketone, acetone oil, ethyl butyl ketone, aldehydes and various other hydrocarbons, and also penetrating finish solvent material, that is, finish solvent material of a generally benzolic character or action in removers, such as benzol and its homologues, benzin and light kerosene and other wax solvents. Although not necessary in all cases, suitable stiffening material, such as wood flour, starch, whiting, infusorial earth or waxy bodies, may be used to increase the consistency of the remover and to decrease evaporation by the film-forming properties of the waxy or soapy bodies. All these ingredients are, of course, preferably thoroughly incorporated by agitation under the desired moderate heat, the waxy or soapy bodies being preferably first dissolved in the more energetic wax solvents, although this is not always necessary. An illustrative remover of this character may be prepared according to the following formula: deodorized light oil of hard wood tar, 50 parts, benzol 20 parts, oil of acetone 15 parts, ceresin wax 3 parts, carnauba wax ½ part. Another illustrative remover may comprise deodorized light oil of hard wood tar 40 parts, heavy benzin 20 parts, methyl ethyl ketone 10 parts, ceresin wax 1 part, and light infusorial earth 5 parts. Another illustrative remover more especially adapted for dipping or tank work may comprise light oil of wood tar 50 parts, paraffin wax 1 part, light kerosene 10 parts and commercial xylol comprising some toluol, cumol and mesitylene 20 parts, although as indicated the stiffening material is not necessary in all cases.

This invention has been described in connection with a number of illustrative ingredients, formulas, proportions and processes, to the details of which disclosure the invention is not, of course, to be limited.

What is claimed is:—

1. The finish remover comprising approximately deodorized light oil of hard wood tar 50 parts, benzol 20 parts, acetone oil 15 parts, ceresin wax 3 parts and carnauba wax ½ part.

2. The finish remover comprising approximately deodorized light oil of hard wood tar 50 parts, benzol 20 parts, acetone oil 15 parts and stiffening material including a waxy body.

3. The finish remover comprising approximately deodorized oil of wood tar 50 parts, penetrating finish solvent material 20 parts, loosening finish solvent material and stiffening material.

4. The finish remover comprising a large proportion of deodorized light oil of hard wood tar with which have been incorporated loosening finish solvent material and stiffening material including a waxy body.

5. The finish remover comprising a large proportion of light oil of hard wood tar with which have been incorporated penetrating finish solvent material and loosening finish solvent material and stiffening material.

6. The finish remover comprising a large proportion of deodorized light oil of wood tar with which have been incorporated loosening finish solvent material and stiffening material.

7. The finish remover consisting in large part of deodorized oil of wood tar with which has been incorporated stiffening material including a waxy body.

8. The finish remover comprising a large proportion of deodorized oil of wood tar with which have been incorporated a miscible thinning solvent agent and stiffening material including a waxy body.

9. The finish remover comprising a large proportion of deodorized oil of wood tar with which have been incorporated thinning finish solvent material including loosening solvent material and stiffening material including a waxy body.

10. The finish remover comprising a large proportion of deodorized light oil of hard wood tar with which miscible loosening finish solvent material has been incorporated.

11. The finish remover comprising a large proportion of deodorized light oil of hard wood tar with which miscible thinning solvent material has been incorporated.

12. The finish remover comprising light oil of hard wood tar having a specific gravity between about .885 and .905, and thinning finish solvent material miscible therewith.

13. The finish remover consisting in large part of deodorized oil of tar with which has been incorporated miscible finish solvent material.

14. The finish remover comprising light oil of hard wood tar having a specific gravity between about .885 and .905, and a volatile organic finish solvent miscible therewith.

15. The finish remover consisting in large part of deodorized light oil of wood tar with which has been incorporated miscible finish solvent material.

CARLETON ELLIS.

Witnesses:
 HARRY L. DUNCAN,
 JESSIE B. KAY.